United States Patent
Sabetta et al.

(10) Patent No.: US 9,811,668 B2
(45) Date of Patent: Nov. 7, 2017

(54) MULTI-CONTEXT EXPLOIT TEST MANAGEMENT

(71) Applicant: SAP SE, Walldorf (DE)

(72) Inventors: Antonino Sabetta, Mouans-Sartoux (FR); Luca Compagna, La Roquette (FR); Serena Ponta, Antibes (FR); Stanislav Dashevskyi, Dnipropetrovsk (UA); Daniel Dos Santos, Trento (IT); Fabio Massacci, Trento (IT)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 14/692,203

(22) Filed: Apr. 21, 2015

(65) Prior Publication Data

US 2016/0314302 A1  Oct. 27, 2016

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |
| G06F 21/54 | (2013.01) |
| G06F 21/53 | (2013.01) |
| G06F 21/56 | (2013.01) |

(52) U.S. Cl.
CPC .......... *G06F 21/577* (2013.01); *G06F 21/53* (2013.01); *G06F 21/54* (2013.01); *G06F 21/566* (2013.01); *G06F 2221/033* (2013.01)

(58) Field of Classification Search
CPC ........ G06F 21/577; G06F 21/53; G06F 21/54; G06F 21/566; G06F 2221/033

USPC .......................................................... 726/25
See application file for complete search history.

(56) References Cited

U.S. PATENT DOCUMENTS

| | | | |
|---|---|---|---|
| 7,757,117 B2* | 7/2010 | Mittal ................. | G06F 11/3414 702/182 |
| 8,166,459 B2 | 4/2012 | Suenbuel | |
| 8,176,480 B1 | 5/2012 | Spertus et al. | |
| 8,256,002 B2* | 8/2012 | Chandrashekhar ... | G06F 21/577 726/25 |
| 8,296,445 B1 | 10/2012 | Hackborn et al. | |

(Continued)

OTHER PUBLICATIONS

Cristian Cadar; Symbolic Execution for Software Testing in Practice Preliminary Assessment; ACM 2011; p. 1066-1071.*

(Continued)

*Primary Examiner* — Monjour Rahim
(74) *Attorney, Agent, or Firm* — Brake Hughes Bellermann LLP

(57) ABSTRACT

An input handler receives an exploit test request specifying at least one exploit to be tested against at least one application in at least one execution environment. A deployment engine deploys the at least one execution environment including instantiating a container providing a virtual machine image and configured based on the exploit test request, the instantiated container including the at least one application. A scheduler schedules execution of the at least one execution environment within at least one execution engine, including scheduling an injection of the at least one exploit as specified in the exploit test request. A report generator generates an exploit test report characterizing a result of the at least one exploit being injected into the at least one execution environment of the at least one execution engine.

19 Claims, 4 Drawing Sheets

(56) References Cited

U.S. PATENT DOCUMENTS

| | | | |
|---|---|---|---|
| 8,332,825 B2 | 12/2012 | Mital et al. | |
| 8,417,798 B2 | 4/2013 | Chen et al. | |
| 8,499,353 B2* | 7/2013 | Lockhart | G06F 11/3612 726/22 |
| 8,505,070 B2 | 8/2013 | Sterland et al. | |
| 8,613,080 B2* | 12/2013 | Wysopal | G06F 11/3612 726/19 |
| 8,745,714 B2 | 6/2014 | Walsh et al. | |
| 8,745,734 B1* | 6/2014 | Brandwine | H04L 63/1408 726/22 |
| 8,776,021 B1 | 7/2014 | King et al. | |
| 8,844,043 B2* | 9/2014 | Williams | G06F 21/577 713/189 |
| 8,938,531 B1* | 1/2015 | Cotton | H04L 63/1433 709/224 |
| 9,262,309 B2* | 2/2016 | Tripp | G06F 11/3688 |
| 9,576,252 B2* | 2/2017 | Haber | G06Q 10/00 |
| 2009/0044271 A1 | 2/2009 | Benameur et al. | |
| 2012/0131561 A1 | 5/2012 | Spiess et al. | |
| 2012/0246619 A1 | 9/2012 | Thirumalai et al. | |
| 2012/0311712 A1 | 12/2012 | Amit et al. | |
| 2013/0179858 A1 | 7/2013 | Mecke et al. | |
| 2013/0254829 A1 | 9/2013 | Jakubowski et al. | |
| 2013/0318402 A1 | 11/2013 | Rapp et al. | |

OTHER PUBLICATIONS

Luca Allodi, Vadim Katov, and Fabio Massacci. Malwarelab, "Experimentation with cybercrime attack tools", Proc. of CSET, 13, 2013, 8 pages.

Andre Arnes, Paul Haas, Giovanni Vigna, and RichardA. Kemmerer, "Digital forensic reconstruction and the virtual security testbed vise", In Roland Bschkes and Pavel Laskov, editors, Detection of Intrusions and Malware & Vulnerability Assessment, vol. 4064 of Lecture Notes in Computer Science, pp. 144-163. Springer Berlin Heidelberg, 2006.

Terry Benzel, "The science of cyber security experimentation", The deter project. In Proceedings of the 27th Annual Computer Security Applications Conference, ACSAC '11, pp. 137-148, New York, NY, USA, 2011. ACM.

Joan Calvet, Carlton R Davis, Jose M Fernandez, Wadie Guizani, Mathieu Kaczmarek, Jean-Yves Marion, Pier-Luc St-Onge, et al., "Isolated virtualised clusters: testbeds for high-risk security experimentation and training", In Proceedings of the 3rd international conference on Cyber security experimentation and test (Berkeley, CA, USA, 2010), CSET, vol. 10, pp. 1-8, 2010.

Eric Eide, "Toward replayable research in networking and systems", Position paper presented at Archive, 2010, 2 pages.

Elizabeth Fong, Romain Gaucher, Vadim Okun, Paul E. Black, and Eric Dalci, "Building a test suite for web application scanners", 2014 47th Hawaii International Conference on System Sciences, 0:479, 2008, 8 pages.

Xuxian Jiang, Dongyan Xu, Helen J. Wang, and Eugene H. Spafford, "Virtual playgrounds for worm behavior investigation", In Alfonso Valdes and Diego Zamboni, editors, Recent Advances in Intrusion Detection, vol. 3858 of Lecture Notes in Computer Science, pp. 1-21. Springer Berlin Heidelberg, 2006.

Stefan Kals, Engin Kirda, Christopher Krgel, and Nenad Jovanovic, "Secubat: a web vulnerability scanner", In WWW, pp. 247-256, 2006.

Giuseppe A. Di Lucca and Anna Rita Fasolino, "Testing web-based applications: The state of the art and future trends. Information and Software Technology", 48(12):1172-1186, 2006. Quality Assurance and Testing of Web-Based Applications.

Roy A Maxion and Kevin S Killourhy, "Should security researchers experiment more and draw more inferences? In Workshop on Cyber Security Experimentation and Testing", Carnegie-Mellon Univ Pittsburch PA Dept of Computer Science, Aug. 2011, 8 pages.

Gary Nilson, Kent Wills, Jeffrey Stuckman, and James Purtilo, "Bugbox: A vulnerability corpus for php web applications", In Presented as part of the 6th Workshop on Cyber Security Experimentation and Test, Berkeley, CA, 2013. USENIX, 8 pages.

OWASP Webgoat Project, retrieved from https://www.owasp.org/index.php/Category: OWASP_WebGoat_Project, Mar. 21, 2015, 2 pages.

Theodoor Scholte, Davide Balzarotti, and Engin Kirda, "Quo vadis? a study of the evolution of input validation vulnerabilities in web applications", In Proceedings of the 15th International Conference on Financial Cryptography and Data Security, FC'11, pp. 284-298, Berlin, Heidelberg, 2012. Springer-Verlag, 15 pages.

Omer Tripp, Pietro Ferrara, and Marco Pistoia, "Hybrid security analysis of web javascript code via dynamic partial evaluation", In International Symposium on Software Testing and Analysis, 2014, 11 pages.

Thomas E. Carroll, David Manz, Thomas Edgar, and Frank L. Greitzer, "Realizing scientific methods for cyber security", In Proceedings of the 2012 Workshop on Learning from Authoritative Security Experiment Results, LASER '12, pp. 19-24, New York, NY, USA, 2012. ACM.

M. Curphey and R. Arawo, "Web application security assessment tools", Security Privacy, IEEE, 4(4):32-41, Jul. 2006.

"Sap product security testing strategy: project charter", SAP AG, Jul. 2013, 1 page.

* cited by examiner

MULTI-CONTEXT EXPLOIT TEST MANAGEMENT

TECHNICAL FIELD

This description relates to security testing for software applications.

BACKGROUND

Software applications are potentially susceptible to illicit third-party exploits. For example, for virtually any software application that is provided by a provider to a user, an unauthorized third party may attempt to gain access to functionality and/or data of the software application.

Various types of security testing are utilized to minimize or eliminate such unauthorized third-party access and other illicit uses of software applications. However, specific security vulnerabilities may be different in varying contexts in which software applications are deployed and executed. Consequently, it is difficult for security testers to ensure that all such software applications are secured against unauthorized third parties.

SUMMARY

According to one general aspect, a system for exploit test management includes instructions recorded on a non-transitory computer-readable storage medium, and executable by at least one processor. The system includes an input handler configured to cause the at least one processor to receive an exploit test request specifying at least one exploit to be tested against at least one application in at least one execution environment, and a deployment engine configured to cause the at least one processor to deploy the at least one execution environment including instantiating a container providing a virtual machine image and configured based on the exploit test request, the instantiated container including the at least one application. The system also includes a scheduler configured to cause the at least one processor to schedule execution of the at least one execution environment within at least one execution engine, including scheduling an injection of the at least one exploit as specified in the exploit test request; and a report generator configured to cause the at least one processor to generate an exploit test report characterizing a result of the at least one exploit being injected into the at least one execution environment of the at least one execution engine.

According to another general aspect, a computer-implemented method for executing instructions stored on a non-transitory computer readable storage medium. The method includes receiving an exploit test request specifying at least one exploit to be tested against at least one application in at least one execution environment, and deploying the at least one execution environment including instantiating a container providing a virtual machine image and configured based on the exploit test request, the instantiated container including the at least one application. The method further includes scheduling execution of the at least one execution environment within at least one execution engine, including scheduling an injection of the at least one exploit as specified in the exploit test request, and generating an exploit test report characterizing a result of the at least one exploit being injected into the at least one execution environment of the at least one execution engine According to another general aspect, a computer program product is tangibly embodied on a non-transitory computer-readable storage medium and comprises instructions. When executed, the instructions are configured to cause at least one computing device to store a plurality of deployable applications, store a plurality of configuration files, including configuration data, and store a plurality of containers as virtual machine images, as well as storing a plurality of exploits. The instructions, when executed, are further configured to cause the at least one processor to deploy at least one execution environment for execution of exploit testing, including exploit testing for designated combinations of the deployable applications, the configuration data, the containers, and the exploits.

The details of one or more implementations are set forth in the accompanying drawings and the description below. Other features will be apparent from the description and drawings, and from the claims.

DETAILED DESCRIPTION

Figure 1:
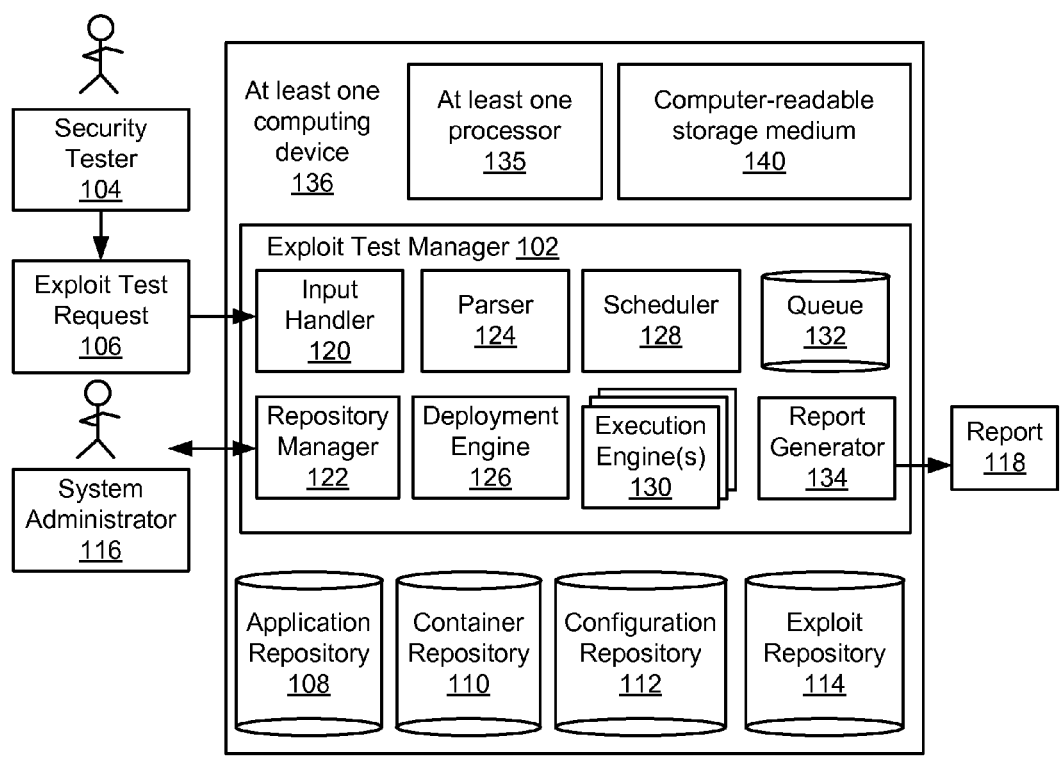
FIG. 1 is a block diagram of a system for multi-context exploit test management.

FIG. 1 is a block diagram of a system 100 for multi-context exploit test management. In the example of FIG. 1, an exploit test manager 102 is configured to interact with a security tester 104 to receive an exploit test request 106, and to thereafter provide, based on the exploit test request 106, automated, repeatable exploit testing for selected ones of many different types and/or versions of software applications, even when such software applications are to be deployed and executed in many different contexts.

In more detail, and as illustrated in the example of FIG. 1, the exploit test manager 102 is provided with access to an application repository 108, a container repository 110, a configuration repository 112, and an exploit repository 114. As also shown in FIG. 1, and described in more detail below, a system administrator 116 may utilize the exploit test manager 102 to configure, populate, and maintain/manage any of the various repositories 108-114.

Accordingly, upon receipt of the exploit test request 106, the exploit test manager 102 may proceed to access the specified application from the application repository 108, and then deploy and execute an instance of a corresponding container as a virtual machine or virtual machine image from the container repository 110, where the deployed instance of the container and the application are configured based on related configuration data from configuration files of the configuration repository 112. As described in more detail below, the configured, deployed instance of the container also may be referred to as an execution environment for the application and exploit being tested.

In this way, one or more exploits from the exploit repository 114 may be applied against, or tested within, the execution environment provided by the selected and configured container and application. The exploit test manager 102 is further configured to generate one or more exploit test report(s) 118 that characterize results and other aspects of the requested exploit testing, while minimizing requirements on, or effort by, the security tester 104. Thus, as may be appreciated from the above description and as described in detail below, such exploit testing is highly automated, and is easily repeatable in a variety of contexts, so that the security tester 104 may quickly and efficiently obtain a large number of test results that are applicable to a large number of users.

The exploit test manager 102 of FIG. 1 may be utilized in a variety of settings. For purposes of non-limiting example and explanation, many examples are provided below in which described software applications include cloud applications, where cloud applications generally refer to known techniques for providing software applications to users remotely over a network, such as in "software as a service" (SaaS) scenarios. Such scenarios, and related scenarios, enable the same software application(s) to be provided in multiple, different contexts, for varying benefits to the application provider and/or user(s) of the software application(s) (e.g., reduced costs or greater reliability when migrating an application to a new platform). However, such variations in context also correspond to potential difficulties in ensuring reliable and complete security testing, because successful protection against an exploit in one context may prove unsuccessful in another context.

The exploit test manager 102 of FIG. 1 thus provides highly adaptable, flexible, efficient, and reliable testing for related scenarios, without requiring highly-specialized knowledge or abilities on the part of the security tester 104. For example, the security tester 104 may represent an employee of a cloud platform provider or operator, which may wish to assure its customers (e.g., software application providers) that a secure platform is in place. In other examples, the security tester 104 may represent an employee of the application provider, who wishes to obtain independent testing of one or more platforms of one or more platform providers. Further non-limiting examples of the security tester 104 and related use cases for the system 100 are provided below, or would be apparent.

The exploit test request 106 may be constructed and utilized in accordance with a number of appropriate techniques. For example, the exploit test manager 102 may provide a graphical user interface (GUI, not explicitly illustrated in FIG. 1) with fillable forms/fields to enable the security tester 104 to identify specific, desired applications, containers, configurations, and exploits, and characteristics thereof. For example, the security tester 104 may use these or related techniques to identify specific versions of applications, specific configuration parameters, or specific aspects of when and how an identified exploit should be applied during security testing. In other implementations, exploit test requests may be accepted in a textual format, e.g., for non-interactive submissions.

Somewhat similarly, the system administrator 116 represents any authorized party who is capable of appropriately modifying, configuring, maintaining, or otherwise overseeing operations of the exploit test manager 102 and the various repositories 108-114. For example, again, the system administrator 116 may represent an employee of a cloud platform provider, or an employee of an application provider.

In some embodiments, the system administrator 116 may be expected to have relatively more extensive technical knowledge than the security tester 104, in order to populate the various repositories appropriately. For example, the system administrator 116 may be expected to have knowledge of current or new exploits that may be relevant to one or more applications. Nonetheless, as with the security tester 104, the exploit test manager 102 may be configured to provide one or more GUIs to the system administrator 116, in order to facilitate complete, correct, and consistent data entry into the various repositories 108-114. Of course, it will be appreciated that, in some embodiments, the security tester 104 and the system administrator 116 may represent a single individual, or class/category of individuals.

The application repository 108 represents any appropriate structured data storage technique and associated software and/or hardware for storing applications and application-related data. The application repository 108 the provides downloadable versions of applications that may require security testing, and that may thus be installed within the execution environment(s) obtained by instantiating a corresponding container from the container repository 110, and in accordance with relevant configuration data from the configuration repository 112. Of course, the number and type of software applications that might be included in the application repository would be too numerous to provide here in any detail. By way of non-limiting example, however, such applications, by themselves, may include various types of business applications, such as supply chain management (SCM) applications, enterprise resource planning (ERP) applications, or Customer Relationship Management (CRM) applications, or virtually any other known existing or future software application.

The container repository 110 similarly represents any appropriate data storage for virtualized computing components or platforms, including, e.g., operating systems, application servers, database servers, database management systems, and other types of supporting applications. Virtualization in this context refers to techniques for using software to create and deploy individual, isolated computing components that execute on underlying hardware/software and that imitate the same or different hardware/software components, to thereby provide an end-user experience that mimics what would occur if the end user were interacting with a conventional hardware implementation of the virtualized component. The end user is thus provided with the possibility of utilizing various types of computing components and platforms, regardless of the type of underlying hardware that may be available. Moreover, the end user may be provided with these and related benefits in a flexible, scalable, and cost-effective manner.

Various types of virtualization exist, or may be developed in the future. For example, some virtualized components include an entire virtual machine environment, including an operating system. In such cases, the virtual machine may operate as virtually any corresponding hardware implementation may operate (e.g., may run a number of different types of applications, perhaps at the same time). In other cases, a single virtual machine may be implemented that shares an operating system with other virtual machines/components. For example, the term container is sometimes used to refer to application-specific virtualized modules or components that share an underlying operating system but that each execute individual, isolated applications that are configured to execute on the underlying operating system. In the present description, the term container should be understood broadly to refer to any of these types of virtualized components. Specific examples of containers and techniques for implementing the container repository 110 are provided below.

The configuration repository 112 may be used to store any appropriate configuration data for the containers of the container repository 110, and, in some circumstances, for the applications of the application repository 108 as well. That is, the configuration repository 112 contains a set of specifications of how an application can be installed and run in a container, including, e.g., the setup required for a given application to run in a given container (e.g., prerequisites such as preloading certain data to a database, creating users, and/or starting a server). Configuration data may thus include any appropriate type of known or future configuration data.

By way of non-limiting example, such configuration data for applications may include databases, application data, or types and quantities of (virtual) computing resources consumed. Configuration data for containers may include an identified operating system and characteristics thereof, as well as types and quantities of underlying hardware resources to be utilized. More specific examples of configuration data of the configuration repository 112 are provided below, or would be apparent to one of skill in the art.

The exploit repository 114 contains descriptions of exploits in some type of executable form, and that is compatible with an execution environment provided based on a selected container and corresponding configuration thereof. Of course, a given exploit will also be considered to be potentially applicable against an application being tested from the application repository 108.

Exploits in this context refer generally to any executable file that, when executed in a specified context, provide a user thereof with unauthorized access to, or use of, functionality or data within the specified context. Exploits include any sequence of steps that must be taken in order to cause unintended behaviour through taking advantage of a vulnerability in an application and/or surrounding environment or context.

For example, such exploits may be used to provide access to sensitive data, such as financial data or personal data. Exploits may hijack capabilities or other functionalities of applications and cause the applications to perform tasks that are not desired by authorized users of the applications, such as tracking user activities and reporting on these to the unauthorized user of the exploit. Other types of exploits may allow the unauthorized user to impersonate the authorized user(s) for various illicit or illegal reasons. All such exploits, and other current and future exploits, by themselves, are assumed to be known or understandable to one of skill in the art, and are not described here in further detail, except for providing specific, non-limiting examples for the purposes of explanation.

As referenced above, modern and future application platforms provide a great deal of flexibility, including portability of applications between different types of execution environments, e.g., in order to meet specific cost, performance, and technical needs. The exploit test manager 102 provides means for the evaluation of exploits as the exploits are reproduced in a number of such different contexts, and facilitates understanding of effects of the exploits in each context, as well as discovery of potential new vulnerabilities.

As may be appreciated from the present description, different context conditions may transform failed exploit attempts into successful ones, and vice versa. A given exploit test may include a number of possible combinations of applications, execution environments, and exploits, each of which may be configured in various ways in the various combinations. For example, an exploit that may be successful in exploiting a first application in a first execution environment may not be successful in exploiting that same application in a second execution environment, but may be successful in exploiting a second application in the second execution environment (again, dependent each time on the various configuration parameters for each iteration). Moreover, upon determining a success of a given exploit, it will be necessary to make some change to the application and/or execution environment, which will necessitate yet another testing (re-testing) of the previously-successful exploit to ensure that the change will prevent future successful exploits.

In the system 100, the exploit test manager 102 provides applications and execution environments in a manner that can be easily deployed and executed, scripted exploits that can be automatically injected into the appropriate applications and execution environments, report generation of the report 118 that provides useful data regarding the tested exploits (e.g., data characterizing why and how an exploit succeeded or failed), and isolated, secure testing environments in which the security tester 104 can run tests in a safe and reliable manner.

In order to obtain these and related results, the system 100 provides for contents of the repositories 108-114 as first-class entities that can be defined and then re-used in many different test runs, in any combination. As a result, the security tester 104 can easily explore the impact of the interplay between containers and configurations on the exploitability of a particular application.

In the example of FIG. 1, the exploit test manager 102 is illustrated as including an input handler 120, that is configured to receive the exploit test request 106 from the security tester 104. Any appropriate technique may be used to enable the security tester 104 to formulate and enter the exploit test request 106, including textual specifications in a suitable format, such as XML (eXtensible Markup Language) or JSON (JavaScript Object Notation). For example, as referenced above, an appropriate Graphical User Interface (GUI) may be used, in which options are provided for entering and identifying, e.g., a desired application and exploit to be tested, as well as a corresponding execution environment. Other parameters that may be included within the exploit test request 106 are described below in conjunction with related operations of the exploit test manager 102 and/or in conjunction with related aspects or operations of the various repositories 108-114.

As also referenced above, the system administrator 116 may be enabled to enter data and configuration parameters for each of the repositories 108-114, likewise using an appropriate GUI. More specifically, a repository manager 122 may be included within the exploit test manager 102 that is configured to interface with each of the repositories 108-114. For example, the repository manager 108 may be configured to enable all standard and applicable database operations, including, e.g., insert, update, delete, and modify operations Once the exploit test request 106 is received, the input handler 120 may provide the received exploit test request 106 to a parser 124, which is configured to parse the contents of the exploit test request 106 and forward the parsed contents to the repository manager 122, a deployment engine 126, and a scheduler 128. For example, the parser 124 may determine that various application, container, configuration, and exploit data will be required to execute the requested exploit test, and may interact with the repository manager 122 to obtain the required data from the corresponding repositories 108-114.

Once obtained, appropriate portions of this repository data will be forwarded by the parser 124 to the deployment engine 126, so that the deployment engine 126 may proceed with instantiating an appropriate execution environment. For example, the deployment engine 126 may receive container and configuration data from the container repository 110 and the configuration repository 112, respectively. The deployment engine 126 may then create a static instance of an execution environment based on this obtained data. In some implementations, the deployment engine 126 also may be configured to select an appropriate hardware platform (perhaps from among a plurality of available hardware platforms) for eventual execution of the instantiated execution environment.

Meanwhile, the scheduler 128 may be configured to control a timing of exploit-related operations with respect to the instantiated execution engine (e.g., injection of one or more portions of an exploit script being tested into the execution environment). For example, as illustrated, one or more execution engine(s) 130 may be configured to receive the static execution environment from the deployment engine 122, and to begin execution of included components (e.g., operating system, servers, databases, and application(s)), in accordance with the retrieved configuration parameters. While this execution proceeds, the scheduler 128 may be responsible for injecting an exploit script, or portion(s) thereof, into the execution environment.

Thus, the execution engine 130 is responsible for interpreting and executing exploits, as well as coordinating operations of the deployment engine 126. For example, the execution engine 130 may be responsible for ensuring that the deployment is successfully completed before executing the exploit.

For example, it may occur that a particular exploit being tested is configured to begin its execution after some pre-defined event, and/or after some pre-determined amount of time. Moreover, the tested exploit may require multiple injections of one or more script(s) or script portions, in sequence or in parallel, in order to simulate real-world operations of the exploit. The scheduler 128 may thus be configured to control the timing and manner of script injections of the exploit(s) being tested, based on parameters received within the exploit test request 106 and/or based on relevant parameters obtained from one of the repositories 108-114, e.g., the exploit repository 114.

The execution engine 130 may thus proceed with the execution of the instantiated execution environments and the injection of the exploits. In so doing, the execution engine may be configured to monitor all relevant operations within the instantiated execution environment being tested. Such monitoring may be used, for example, to communicate injection timing requirements to the scheduler, such as by reporting a precipitating event that may cause exploit script injection to begin. In other examples, the execution engine 130 may monitor results of the exploit being injected, where such results may be relevant to whether, how, why, and/or to what extent the exploit was successful or unsuccessful.

The monitoring results of monitoring operations of the execution engine 130 may be output to a queue 132 for storage. A report generator 134 may then interface with the queue 132 to generate one or more reports 118. Metadata about the exploit and logs of its execution may be attached to the report 118, in order to provide further details that enable determinations regarding the exploit results. Examples of types of reports that may be generated are provided below, or would be apparent. The report 118 may be provided to the security tester 104, and to any interested and authorized party, such as an application developer of the application being developed.

Of course, the system 100 of FIG. 1 represents a highly simplified view of example implementations of the exploit test manager 102. For example, the system 100 of FIG. 1 illustrates at least one computing device 136 that includes at least one processor 138 and non-transitory computer readable storage medium 140. That is, the example of FIG. 1 generally illustrates that one or more computing devices, perhaps in communication with one another by way of an appropriate computer network, may include one or more processors, which may execute in parallel in order to support operations of the exploit test manager 102 (e.g., to implement parallel processing for executing a plurality of execution environments). More specifically, one or more such processors may access and implement corresponding computer code or other instructions stored on the non-transitory computer readable storage medium 140, in order to thereby provide the exploit test manager 102.

Of course, many other potential elements of the at least one computing device 136 are not explicitly illustrated in the example of FIG. 1, but would be apparent to one of skill in the art. For example, it will of course be appreciated that an appropriate display device may be utilized for viewing or other consumption by the user(s) of the system 100.

Further, although the exploit test manager 102 is illustrated in FIG. 1 as a single element including various sub-elements, various embodiments may be implemented in which one or more of the various sub-elements are implemented separately (e.g., on separate, communicating computing devices of the at least one computing device 136). Somewhat similarly, although the various sub-elements are illustrated and described as separate, discrete components, it will be appreciated that any one such component may be implemented as two or more sub-components. Conversely, in other implementations, it may occur that any two or more of the sub-elements may be combined for implementation as a single sub-element of the exploit test manager 102.

Figure 2:
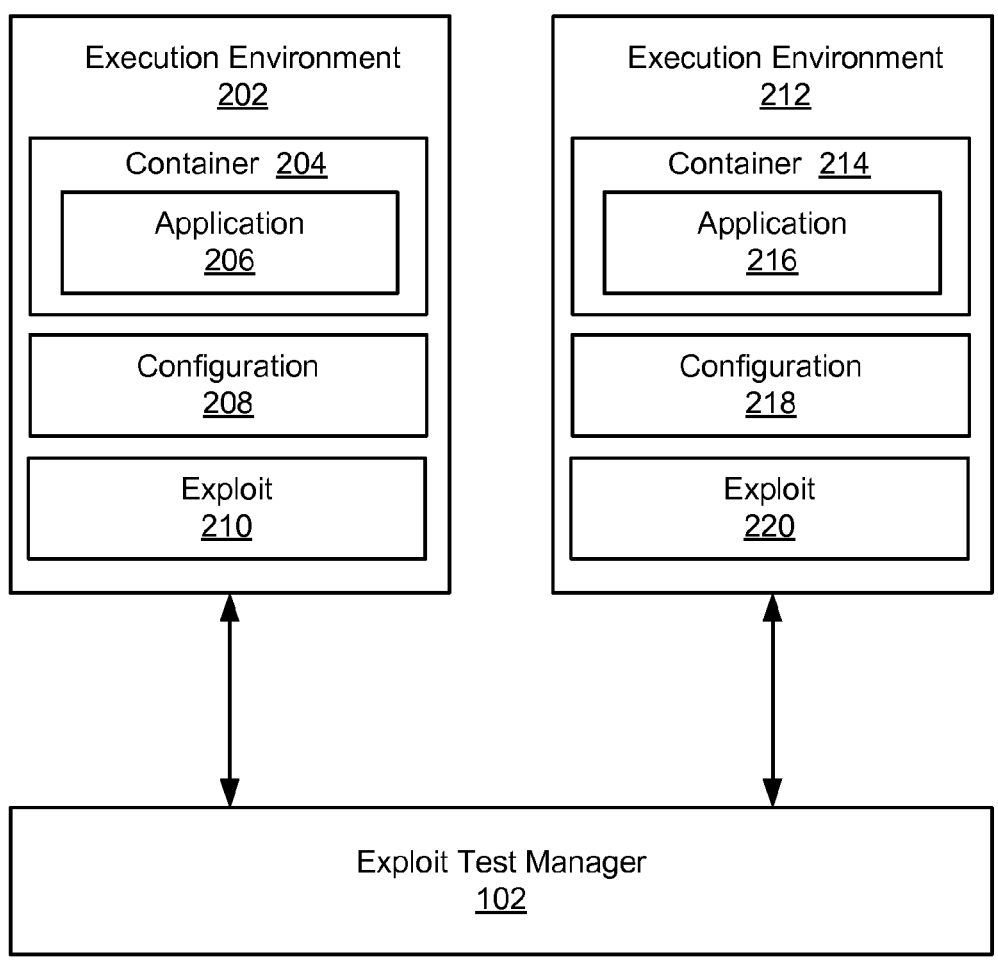
FIG. 2 is a block diagram illustrating an example implementation of the system of FIG. 1.

FIG. 2 is a block diagram illustrating an example implementation of the system 100 of FIG. 1. In the example of FIG. 1, the exploit test manager 102 is illustrated as testing exploits with respect to an execution environment 202 and an execution environment 212, which may be provided, e.g., in conjunction with the execution engine 130, as described above.

As shown, the execution environment 202 includes a container 204 running an application 206 to be tested, both being configured according to configuration 208. An exploit 210 is illustrated as having been injected into the execution environment 202.

Similarly, the execution environment 212 includes a container 214 running an application 216, both being configured according to configuration 218. An exploit 220 is illustrated as having been injected into the execution environment 212.

From the above description, it will be apparent that the example of FIG. 2 illustrates many different possible combinations of containers, applications, configurations, and exploits. For example, in FIG. 2, it may occur that the two execution environments are identical, except that the exploits 210 and 220 being tested are different. Conversely, it may occur that the exploits 210, 220 are the same, while one or more of the containers 204/214, applications 206/216, and/or configurations 208/218 are different.

In this way, the systems of FIGS. 1 and 2 enable the security tester 104 to attempt one or more exploits against various sets of applications, containers, and configurations. Exploits may be injected individually, or in a batch. Further in the systems of FIGS. 1 and 2, the execution of the application and of the exploit may occur in an isolated and clean environment.

Figure 3:
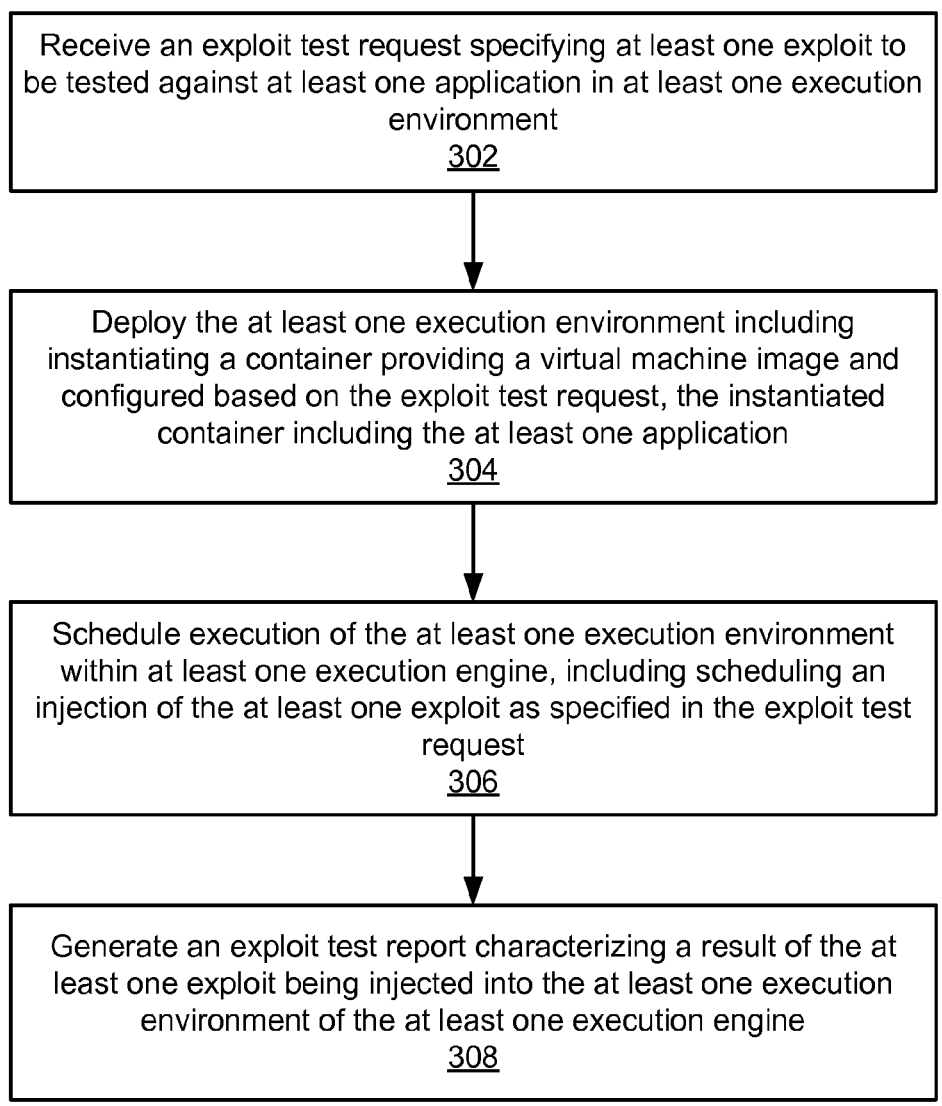
FIG. 3 is a flowchart illustrating example operations of the system of FIGS. 1 and 2.

FIG. 3 is a flowchart 300 illustrating example operations of the system 100 of FIG. 1. In the example of FIG. 3, operations 302-308 are illustrated as separate, sequential operations. In various implementations, additional or alternative operations may be included, or one or more of the operations 302-308 may be omitted. In all such implementations, any two or more operations or sub-operations may be executed in a partially or completely overlapping or parallel manner, or in a nested, iterative, branched, or looped manner.

In the example of FIG. 3, an exploit test request specifying at least one exploit to be tested against at least one application in at least one execution environment is received (302). For example, the input handler 120 may receive the exploit test request 106.

The at least one execution environment may be deployed, including instantiating a container providing a virtual machine image and configured based on the exploit test request, the instantiated container including the at least one application (304). For example, the deployment engine 126 may deploy one or both of the execution environments 202, 212 of FIG. 2. As described, the deployed execution environments 202, 212 are deployed based on retrieval of necessary data from the repositories 108-114 by the repository manager 122 as determined from parsing of the exploit test request 106 by the parser 124, and may initially be static, and configured for subsequent execution by execution engine 130.

Specifically, execution of the at least one execution environment may be scheduled within at least one execution engine, including scheduling an injection of at least one exploit as specified in the exploit test request 306). For example, the scheduler 128 may be configured to inject the specified exploit into the deployed and executing execution environment (e.g., 202 and/or 212 in FIG. 2), according to an injection schedule specified by the parser 124 based on parsing of the exploit test request 106.

An exploit test report characterizing a result of the at least one exploit being injected into the at least one execution environment of the at least one execution engine may thus be generated (308). For example, the report generator 134 may be configured to generate the report 118, based on data stored in the queue 132 in conjunction with monitoring operations of the execution engine 130.

Figure 4:
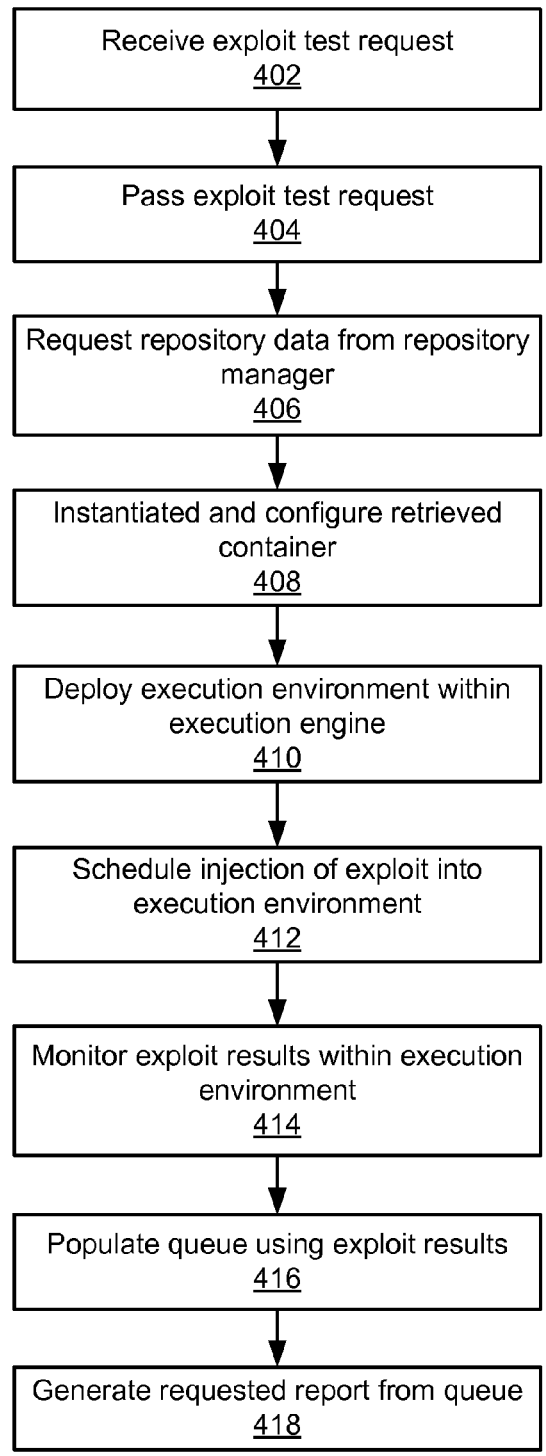
FIG. 4 is a flowchart illustrating more detailed example operations related to operations of the system of FIGS. 1 and 2.

FIG. 4 is a flowchart 400 illustrating more detailed example operations of the system 100 of FIG. 1. In the example of FIG. 4, the exploit test request 106 is received (402) that specifies all relevant details for data to be retrieved from the repositories 108-114, as well as for timing and other execution details for executing a specified exploit.

In some implementations, all such data to be retrieved may already be present within the various repositories 108-114. However, it may occur that some or all such data may not be present at the time of the exploit test request. In such cases, and related scenarios, and as referenced above, the system administrator may utilize system administration tools, such as the repository manager 122, to 116 manage the various repositories 108-114 and update stored data as needed to enable execution of the desired exploit test.

For example, administration tools may provide utilities to import applications and/or exploits from other sources, or to write exploits in a desired manner. In other examples, such administration tools may enable management of the stored containers (e.g., an ability to clone containers, or modify them incrementally). In this way, for example, the system 100 may be easily extensible for inclusion of new exploits, applications, and execution environments. Further along these lines, the exploits may be organized in classes, so as to benefit from inheritance. For example, exploits may be structured as classes representing unit tests, so that every exploit may be self-contained and executed independently, and may be targeted to take advantage of a certain vulnerability in a certain application.

The parser 124 may proceed to parse the exploit test request 106 (404) and identify both the relevant data to be obtained from the corresponding repositories 108-114, and any included execution-related instructions, including scheduling information for scheduling operations of the to-be constructed execution environment. Such scheduling information may include scheduling of specific operations of the application to be tested, the exploit being tested, and/or any relevant portions of the execution environment (e.g., scheduling operations of operating systems, application servers, database servers, or other components that may interact with the application being tested in a manner that may affect an outcome of the exploit being tested).

Then, parser 124 may instruct the repository manager 122 to retrieve the required data from the repositories 108-114 (406), thereby enabling instantiation and configuration of a desired container by the deployment engine 126 (408). The resulting execution environment may then be deployed for execution within the execution engine 130 (410).

As the execution engine 130 proceeds to execute the deployed execution environment, scheduled injections of the exploit and other operations of the execution environment may be executed according to the scheduling information received from the scheduler 128 (412). In conjunction with such scheduling and resulting executions, exploit results may be monitored within the execution environment (414).

Accordingly, the queue 132 may be populated with the monitored execution results (416). The report generator 134 may thus extract any desired exploit-related data from the queue 132 to generate the report 118 (418). In some implementations, the report 118 may be generated automatically, e.g., based on parameters of the exploit test request 106, and/or on an existing parameterization of the report generator 134 (where such existing parameterizations may vary, e.g., based on the (type of) application, container, configuration, exploit, and/or combinations thereof, for which testing is being executed).

In other implementations, the report 118 may be generated in response to a specific request. For example, the security tester 104 or other authorized party may be enabled to interact with the report generator 134 and to cause the report generator 134 to query the queue 132 in a desired manner. In this way, the report 118 may be highly customizable and may be obtained as needed, even sometime after the actual exploit test is conducted (assuming data is stored in the queue for a sufficient amount of time).

The systems and methods of FIGS. 1-4 provide many features and advantages, which may cover different phases of a software development life cycle, and fulfill the needs of different stakeholders within that life cycle. For example, the system 100 of FIG. 1 addresses the problem(s) of evaluating the applicability of a set of exploits to a set of cloud applications (e.g., different versions of the same application) in different execution environments (e.g., execution conditions, platform versions, and configurations). The system 100 provides for packing applications and execution environments that can be easily and rapidly deployed, scripted exploits that can be automatically injected, detailed reporting, and an isolation between running instances that enables a wide range of safe and reliable security testing. Thus, the system 100 provides containers and configurations as first class entities that can be defined once and re-used in many test runs, in many combinations, thereby allowing the security tester 104 to explore the impact of the interplay between containers and configurations on the exploitability of a particular application.

For example, the system 100 provides for executable documentations of vulnerability findings. That is, when a vulnerability is detected for an application, being able to reproduce an attack is important to investigating the root cause of the vulnerability, and to providing a timely solution. In the system 100 of FIG. 1, the exploit scripts and configured containers effectively provide executable descriptions of an attack. Thus, for example, produced exploits and configured containers may be useful for internal product security response teams and/or security validators, as well as for external security researchers (such as when companies set up incentives or bounty programs) who might want to investigate potential exploits. Further, the system 100 of FIG. 1 enables fast and accurate evaluation as to whether a reported potential attack is real (or not).

The system 100 of FIG. 1 also provides for automated validation and regression testing. For example, as part of the software development cycle, the system 100 may be used to check for the absence of known vulnerabilities, or to perform regression tests to verify that a previously-detected vulnerability has not been re-introduced after having been fixed. For example, a corpus of exploits and configurations may be stored in a corporate-wide repository and used to perform automated tests all along the software development cycle.

Particularly in large corporations, the results of these tests may be used as evidence needed in order to pass quality assurance tests. Currently, much of the process to produce such evidence relies on manual work, which increases costs, errors, and unpredictability of the process.

In other examples, the system 100 may be used to define a process for continuous assessment and evaluation of security testing techniques. For example, security testing techniques may be bench-marked, and then probed and compared against vulnerable <application, execution environment> pairs for which exploits are available. Precise information regarding which technique best-suits which vulnerability may be made available in the reporting.

The system 100 is also very useful in penetration testing, or pentest. Penetration testing refers generally to an attack on a known (target) computer system for the express purpose of identifying vulnerabilities and weaknesses. One problem that arises in penetration testing is the complexity of setting up and reproducing the conditions of the target system, which may involve many hosts and software components, which of which may need to be configured in a specific way. The system 100 is capable of capturing (components of) such target systems as reusable scripts, which can be used and re-used across many different pen-testing sessions. Accordingly, the system 100 provides automation, reproducibility, and the ability to proceed stepwise in the exploration of the effects of different configurations and versions of the relevant software elements, in the presence (or absence) of vulnerabilities in the target system(s).

As a final example of general use-case scenarios for the system 100 of FIG. 1, the system 100 may be used to provide a training toolkit for secure coding training. For example, such training may be provided in large enterprises, or in response to requirements of certain certification standards. The system 100 enables training in the writing and reading of exploits as an effective technique for providing hands-on knowledge of how security vulnerabilities may occur, as well as how to code defensively in order to prevent them.

In addition to the above-described general use-cases, the following description provides specific examples of implementations of the system 100 of FIG. 1. Of course, these implementations are provided merely for the sake of illustration and explanation, and are not intended to be limiting as to the scope of other implementations of the system 100, or related systems.

The example implementations contemplate the use of a corpus of potentially vulnerable web applications using a variety of programming languages. For example, applications such as Wordpress, CuteFlow, Horde, PHP Address Book, Drupal, Proplayer, Family Connections, AjaXplorer, Gigpress, Relevanssi, PhotoSmash, WP DS FAQ, SH Slideshow, yolink search, CMS Tree page view, TinyCMS, Store Locator Plus, phpAccounts, eXtplorer, and Glossword may be used, perhaps expressed in the PHP programming language. The corpus may further include Java applications, such as WebGoat, using containers such as Ubuntu, Tomcat, or Java based containers.

Relevant containers may include Ubuntu, Apache, or Mysql based containers. Relevant exploits may include SQL Injections (SQLi) or more generally code-injection attacks, cross-site scripting (XSS), Authentication Bypass, Denial of Service, directory traversal, cross-site request forgery (CSRF), or local file inclusion (LFI) vulnerability.

Thus, in general, a developer or other security tester 104 may have access to a corpus of information for each of a plurality of applications, containers, and exploits. In a first specific example, the developer may have a working access control exploit for MyWebApp 3.2 running on the SAP system SAP HANA SP5 with a configuration "C1" (representing, e.g., a role "Manager" assigned to Alice and Bob). The developer may wish to explore whether the same exploit would also work for (i) MyWebApp 3.2 running on SAP HANA SP5 with configuration "C2" (representing, e.g., the role "Manager" assigned only to Bob), (ii) MyWebApp 3.3 running on SAP Hana SP5 with configuration C1, or (iii) MyWebApp 3.2 running on SAP Hana SP6 with configuration C2.

In a second example, a developer has a working SQL injection exploit for WordPress 3.2 running with MySQL, and would like to know whether the same exploit works (i) for WordPress 3.2 running with PostgreSQL; (ii) for WordPress 3.3 running with MySQL; and (iii) for WordPress 3.3 and PostgreSQL.

In a third example, a developer has two applications (e.g., both applications include a set of .html, .php and .js files in a Wordpress folder), two containers (e.g., one with Ubuntu, Apache and MySQL, and one with Ubuntu, Apache and PostgreSQL). The developer has four configurations (e.g., one for WP3.2 with MySQL, one for WP3.3 with MySQL, one for WP3.2 with PostgreSQL and one for WP3.3 with PostgreSQL), and a single exploit to be tested against all of the various combinations of these applications, containers, and configurations, a script that navigates to the vulnerable page, interacts with it, and injects a payload, simulating the actions of an attacker.

Then, in an example implementation, the execution engine 130 may be implemented in Python, e.g., as the main Python module that binds all the modules and features together. It supports single and batch modes of operation. The single mode allows testers to specify and run a desired exploit against a chosen application just once. This is useful if a tester wants to quickly check whether the same exploit works for a few different applications, different versions of the same application, or the same application in different environments. A .csv report is generated at the end of the run. To run applications and exploits in the batch mode, the execution engine enables looping through a folder containing exploit files, and injects them in their respective configurations, generating a summary .csv report in the end. In this mode, the Execution Engine maps exploits to applications by scanning the metadata in each exploit for the appropriate targets.

Applications may be packaged as zip files containing all their necessary code and supporting files, such as database dumps. Unpacked applications may be made accessible by the Execution Engine.

Containers may be provided using known or future formats for packing, shipping and running applications with a lightweight file repository. Two example types of containers include software-specific and application-specific containers. For example, software-specific containers that consist of generic software components may be required for certain types of web applications. Such containers may encapsulate an operating system, server and database engine, and have to be built only once. Application-specific containers are built on top of software-specific containers every time the Execution Engine runs an application. In these example implementations, the Execution Engine clones a corresponding software-specific container and adds the application files to the clone.

At least one (set of) configuration file(s) may be included for each application. These configuration files may specify, e.g., how to deploy and set up the application within the corresponding application-specific container. Each configuration may include at least one file for instantiating the application's container, and a shell script file with additional commands to be executed within the container (e.g., running a server instance, or starting a database server).

In these example implementations, exploits may be implemented as Python classes that share common properties. For example, such properties may include: (1) every exploit class contains metadata describing its specific characteristics such as name, description and type, target application and container; (2) logging and reporting capabilities—exploit classes maintain logging information and results of the run, passing this information to the Execution Engine.

A report may be implemented as a .csv (comma separated value) file that the Execution Engine creates or updates every time it runs an exploit. Every report contains at least one line per exploit that was executed. For example, a line may include a name of the exploit and the target application, application-specific container, type of the exploit, the exploit start-up status and the overall result and other data. Along with this report a log fie may be issued that contains information which can be used to debug exploits.

In the following, an exploit test using the above-described example implementation is described, given an existing application. The steps for the exploit test might include adding the application; creating the configuration files; building containers; and creating and running the exploits.

Again, Wordpress 3.2 may be used by way of non-limiting example. In the example, the code of the application is copied into a separate folder under the applications root <testbed_root>/data/targets/applications. The folder name corresponds to a chosen name of the application To deploy the Wordpress 3.2 application, all of its files may be copied to the folder <testbed_root>/data/targets/applications/WordPress_3_2. The name of the configuration folder in the example is set to be the same as the name of the corresponding container. If there is no software-specific container that might be reused by the application, this container must be created. Configuration files for software-specific containers can be located under a <testbed_root>/data/targets/containers folder.

In the example, a software-specific container is created with the ubuntu-apache-mysql name, since the application requires Apache as a web server and MySQL as a database engine. As a next step, the configuration files for the application-specific container are created. Finally, an exploit is created and run for the Wordpress 3.2 application by creating a file with a Python class under a testbed_root>/data/exploits folder. The new exploit class is subclassed from an already-existing BasicExploit class. The BasicExploit class provides generic metadata and logging The exploit's metadata may be specified in an attributes dictionary and the exploit steps may be put into a runExploit( )method. The attributes dictionary contains exploit metadata, and the runExploit( )method contains the steps required to reproduce the exploit and to check its success. By default, the execution report may be saved into the testbed_root>/reports/ExploitResults.csv file, but other locations may be specified Thus, the system 100 of FIG. 1 provides a security tester with a way to automatically switch execution environments and application versions, and re-test exploits on the application versions, as needed. The results of these tests can be automatically collected so that a tester can see how different exploits work when the environment and/or application version changes. These and related exploit tests can be run, even considering the various possible combinations of execution environments, supporting components, application versions, and configurations. In some implementations, it is possible to run exploit tests in which the security tester can choose whether to start from a clean environment for each individual exploit/execution environment pair, or to reuse the same environment for a group of related exploits.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for exploit test management including instructions recorded on a non-transitory computer-readable storage medium, and executable by at least one hardware processor, the system comprising:
   an input handler configured to cause the at least one hardware processor to receive an exploit test request specifying at least one exploit to be tested against at least one application in at least one execution environment, the at least one execution environment including an operating system and an application server, and the at least one exploit including at least two exploit script portions;
   a deployment engine configured to cause the at least one hardware processor to deploy the at least one execution environment including instantiating a container providing a virtual machine image and configured based on the exploit test request, the instantiated container actively executing operations of the at least one application on the operating system and application server within at least one execution engine;
   a scheduler configured to cause the at least one hardware processor to schedule injections of the at least two exploit script portions into the at least one execution environment of the at least one execution engine, with a timing determined from the exploit test request and defined with respect to the actively executing operations; and
   a report generator configured to cause the at least one hardware processor to generate an exploit test report characterizing a result of the injections into the at least one execution environment of the at least one execution engine.

2. The system of claim 1, further comprising a parser configured to cause the at least one hardware processor to parse the exploit test request to identify scheduling information for the scheduler therefrom, including the timing of the at least two exploit script portions.

3. The system of claim 2, wherein the parser is configured to cause the at least one hardware processor to parse the exploit request to identify the at least one application, the container, configuration data for the container, and the at least one exploit, the system further comprising a repository manager configured to access at least one repository to obtain the at least one application, the container, configuration data for the container, and the at least one exploit.

4. The system of claim 1, further comprising a repository manager configured to cause the at least one hardware processor to access an application repository configured to store a plurality of deployable applications, including the at least one application.

5. The system of claim 1, further comprising a repository manager configured to cause the at least one hardware processor to access a container repository configured to store a plurality of deployable containers, including the container.

6. The system of claim 1, further comprising a repository manager configured to cause the at least one hardware processor to access a configuration repository configured to store a plurality of configuration files, including configuration data used to configure the instantiated container.

7. The system of claim 6, wherein the configuration data is used to configure the at least one application during the instantiating of the container.

8. The system of claim 1, further comprising a repository manager configured to cause the at least one hardware processor to access an exploit repository configured to store a plurality of exploits as scripts, including the at least one exploit.

9. The system of claim 1, wherein the at least one application, the container, the at least one exploit, and configuration data used to instantiate the container are selected from among a plurality, respectively, of applications, containers, exploits, and configuration data, and wherein the system is configured to test combinations of the applications, containers, exploits, and configuration data with respect to results of the exploits.

10. The system of claim 1, wherein the execution engine is further configured to monitor operations of the at least one execution environment and to populate a queue based on the monitored operations.

11. A computer-implemented method for executing instructions stored on a non-transitory computer readable storage medium, using at least one hardware processor, the method comprising:
   receiving an exploit test request specifying at least one exploit to be tested against at least one application in at least one execution environment, the at least one execution environment including an operating system and an application server, and the at least one exploit including at least two exploit script portions;

deploying the at least one execution environment including instantiating a container providing a virtual machine image and configured based on the exploit test request, the instantiated container actively executing operations of the at least one application on the operating system and application server within at least one execution engine;

scheduling injections of the at least two exploit script portions into the at least one execution environment of the at least one execution engine, with a timing determined from the exploit test request and defined with respect to the actively executing operations; and generating an exploit test report characterizing a result of the injections into the at least one execution environment of the at least one execution engine.

12. The method of claim 11, comprising parsing the exploit test request to identify scheduling information for execution of the at least one execution environment, including the timing of the at least two exploit script portions.

13. The method of claim 11, wherein the at least one application, the container, the at least one exploit, and configuration data used to instantiate the container are selected from among a plurality, respectively, of applications, containers, exploits, and configuration data, and further comprising testing combinations of the applications, containers, exploits, and configuration data with respect to results of the exploits.

14. The method of claim 11, wherein the deploying the at least one execution environment comprises:

accessing an application repository configured to store a plurality of deployable applications, including the at least one application;

accessing a container repository configured to store a plurality of deployable containers, including the container;

accessing a configuration repository configured to store a plurality of configuration files, including configuration data used to configure the instantiated container; and accessing an exploit repository configured to store a plurality of exploits as scripts, including the at least one exploit.

15. A computer program product, the computer program product being tangibly embodied on a non-transitory computer-readable storage medium and comprising instructions that, when executed, are configured to cause at least one computing device to:

store a plurality of deployable applications;

store a plurality of configuration files, including configuration data;

store a plurality of containers as virtual machine images;

store a plurality of exploits, including at least two exploit script portions;

deploy at least one execution environment for execution of exploit testing, including exploit testing for designated combinations of the deployable applications, the configuration data, the containers, and the exploits, in which a designated combination of the designated combinations is implemented using an instantiated container of the plurality of containers, in which actively executing operations of the at least one application are executed using an operating system and an application server deployed within at least one execution engine; and schedule injections of the at least two exploit script portions into the at least one execution engine, with a timing determined from an exploit test request and defined with respect to the actively executing operations.

16. The computer program product of claim 15, wherein the execution of the exploit testing includes receiving the exploit test request specifying at least one exploit of the plurality of exploits and at least one application of the deployable applications.

17. The computer program product of claim 16, wherein the instructions, when executed, are further configured to instantiate the instantiated container of the plurality of containers based on the at least one exploit and the deployable application, as obtained from the exploit test request.

18. The computer program product of claim 15 wherein the instructions, when executed, are further configured to:

monitor operations of the at least one execution environment and populate a queue based on the monitored operations.

19. The computer program product of claim 15 wherein the instructions, when executed, are further configured to:

generate an exploit test report characterizing a result of the at least two exploit script portions being injected into the at least one execution engine.

* * * * *